US006473408B1

(12) United States Patent
Rochberger et al.

(10) Patent No.: US 6,473,408 B1
(45) Date of Patent: Oct. 29, 2002

(54) BUILDING A HIERARCHY IN AN ASYNCHRONOUS TRANSFER MODE PNNI NETWORK UTILIZING PROXY SVCC-BASED RCC ENTITIES

(75) Inventors: Haim Rochberger, Netanya (IL); Kenneth Benstead, Shrewsbury, MA (US); Alexander Or, Nesher (IL)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/315,213

(22) Filed: May 19, 1999

(51) Int. Cl.$^7$ ............................................. H04L 12/56
(52) U.S. Cl. .................................... 370/255; 370/395.2
(58) Field of Search ............................... 370/254, 255, 370/256, 257, 258, 395.1, 395.2, 395.21, 395.3, 395.31, 395.32, 400.408, 410; 709/220, 227, 238

(56) References Cited

U.S. PATENT DOCUMENTS

| | | | |
|---|---|---|---|
| 5,291,477 A | 3/1994 | Liew | 370/54 |
| 5,361,256 A | 11/1994 | Doeringer et al. | 370/60 |
| 5,420,862 A | 5/1995 | Perlman | 370/85.13 |
| 5,455,865 A | 10/1995 | Perlman | 380/49 |
| 5,483,536 A | 1/1996 | Gunji et al. | 370/85.14 |
| 5,491,690 A | 2/1996 | Alfonsi et al. | 370/60 |
| 5,495,479 A | 2/1996 | Galaand et al. | 370/60 |

(List continued on next page.)

OTHER PUBLICATIONS

Perlman, R., "Interconnections: Bridges and Routers", Addison–Wesley Publishing, Section 9.2.4, Chapter 9, pp. 205–264 (1992).

Sedgewick, R., "Algorithms", Second Edition, Addison–Wesley Publishing, Chapter 17, pp. 245–257 (1988).

Doeringer, W. et al., "Routing on Longest–Matching Prefixes", *IEEE/ACM Transactions on Networking*, vol. 4, No. 1, Feb. 1996, pp. 86–97.

Williams, K. A., "A Distributed ATM Network Based on an Optical Passive Star", printed from website http://williams.cs.ncat.edu/ATMStar.htm, 2 pages, (1998).

"All–optical ATM–Switch based on Self Electro–optic Effect Devices (SEED's)", printed from website http://www.stw.nl/projecten/T/tel3997.html, 2 pages, Feb. 2, 1997.

ATM Forum PNNI Specification Version 1.0, AF–P-NNI–0055, ATM Forum Technical Committee, Mar. 1996, pp. 13–29, 58–62.

*Primary Examiner*—Kwang Bin Yao
(74) *Attorney, Agent, or Firm*—Howard Zaretsky

(57) ABSTRACT

A system of building a hierarchy in a PNNI based ATM network utilizing one or more proxy SVCC-based RCC entities. The invention separates the routing, signaling, etc. functions from the functions required to be performed by the peer group leader and the logical group node. A dedicated computing platform is connected to the network but does not perform functions related to routing, signaling, etc. Rather, it is dedicated to running peer group leader and logical group node functions, including complex node representation (summarization calculations) of the child peer group. The dedicated computer has PVCs connecting it to one or more entities that are termed 'proxy SRCC' nodes. The proxy SRCC nodes perform the SRCC functionality on behalf of the dedicated computer. When the border nodes in the peer group run the Hello FSM over outside links they each advertise the closest proxy SRCC entity, which is themselves. The border nodes on the other side of the outside link are operative to then generate an uplink with the advertised address of the proxy SRCC. The logical group nodes then establish RCC SVCCs to one of the proxy SRCCs. The PNNI routing messages are relayed from the proxy SRCC to the dedicated computer peer group leader/logical group node via a previously established PVC.

6 Claims, 6 Drawing Sheets

U.S. PATENT DOCUMENTS

| | | | |
|---|---|---|---|
| 5,544,327 A | 8/1996 | Dan et al. | 395/250 |
| 5,550,818 A | 8/1996 | Brackett et al. | 370/60 |
| 5,566,014 A | 10/1996 | Glance | 359/124 |
| 5,590,118 A | 12/1996 | Nederlof | 370/218 |
| 5,600,638 A | 2/1997 | Bertin et al. | 370/351 |
| 5,603,029 A | 2/1997 | Aman et al. | 395/675 |
| 5,629,930 A | 5/1997 | Beshai et al. | 370/396 |
| 5,649,108 A | 7/1997 | Spiegel et al. | 395/200.12 |
| 5,673,263 A | 9/1997 | Basso et al. | 370/396 |
| 6,041,057 A * | 3/2000 | Stone | 370/397 |

* cited by examiner

BUILDING A HIERARCHY IN AN ASYNCHRONOUS TRANSFER MODE PNNI NETWORK UTILIZING PROXY SVCC-BASED RCC ENTITIES

FIELD OF THE INVENTION

The present invention relates generally to data communications networks and more particularly relates to a method of representing a complex node in an ATM based PNNI network.

BACKGROUND OF THE INVENTION

Asynchronous Transfer Mode

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in the Private Network Node Interface (PNNI) Phase 0 and Phase 1 specifications published by ATM Forum. The previous Phase 0 draft specification is referred to as the Interim Inter-Switch Signaling Protocol (IISP). The goal of the PNNI specifications is to provide customers of ATM network equipment multi-vendor interoperability.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well-known link state routing technique.

The second protocol is effective for signaling, i.e., the message flows used to establish point-to-point and point-to-multipoint connections across the ATM network. This protocol is based on the ATM Forum User to Network Interface (UNI) signaling with mechanisms added to support source routing, crankback and alternate routing of source SETUP requests in the case of bad connections.

With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical link becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical link begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor. If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged.

Note that flooding is an ongoing activity wherein each node issues PTSPs with PTSEs that contain updated information. The PTSEs contain the topology databases and are subject to aging and are removed after a predefined duration if they are not refreshed by a new incoming PTSE. Only the node that originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort which is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the first step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels is included in the database summary. The PTSP and PTSE header information of each such PTSE is listed in one of the node's database packets. PTSEs for which new instances are received after the exchanging status has been entered may not be included in a database summary packet since they will be handled by normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet containing one or more entries from the PTSE request list. The PTSE request list packets are only sent in the Exchanging state and the Loading state. The node can send a PTSE request packet to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

A major feature of the PNNI specification is the routing algorithm used to determine a path for a call from a source user to a destination user. The routing algorithm of PNNI is a type of link state routing algorithm whereby each node is responsible for meeting its neighbors and learning their identities. Nodes learn about each other via the flooding of PTSEs described hereinabove. Each node computes routes to each destination user using the information received via the PTSEs to form a topology database representing a view of the network.

Using the Hello protocol and related FSM of PNNI, neighboring nodes learn about each other by transmitting a special Hello message over the link. This is done on a periodic basis. When a node generates a new PTSE, the PTSE is flooded to the other nodes within its peer group. This permits each node to maintain an up to date view of the network.

Once the topology of the network is learned by all the nodes in the network, routes can be calculated from source to destination users. A routing algorithm commonly used to determine the optimum route from a source node to a destination node is the Dijkstra algorithm. The Dijkstra algorithm is used to generate the Designated Transit List which is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

The algorithm begins with the source node (self) as the root of a tree by placing the source node ID onto the Path List. Next, for each node N placed in the Path List, N's nearest neighbors are examined. For each neighbor M, the cost of the path from the root to N to the cost of the link from N to M is added. If M is not already in the Path List or the Tentative List with a better path cost, M to the Tentative List is added.

If the Tentative List is empty, the algorithm terminates. Otherwise, the entry in the Tentative List with the minimum cost is found. That entry is moved to the Path List and the examination step described above is repeated.

Complex Node

The ATM PNNI specification provides for a topological hierarchy that can extend up to The hierarchy is built from the lowest level upward with the lowest level representing the physical network. A node in the lowest level represents only itself and no other nodes. Nodes in the upper levels, i.e., two through ten, are represented by what are known as logical nodes. A logical node does not exist physically but is an abstraction of a node. A logical node represents an entire peer group but at a higher level in the hierarchy.

A complex node representation is used to represent the aggregation of nodes in a peer group at the level of the logical node. The metrics, attributes and/or parameters (hereinafter referred to simply as metrics) of the links and nodes within the peer group are represented in summarized form. This permits peer groups with large numbers of nodes and links to be represented in a simple fashion.

A disadvantage of the complex node representation is that each logical group node entity must run a heavy algorithm in order to generate the logical group node PTSEs and the information contained therein. Each logical group node must also run the signaling algorithms, which are complicated and heavy by themselves, in order to generate the SVCC-based RCC for the logical links connecting that particular logical group node to other entities.

In actuality, however, one of the physical nodes making up a peer group is given the task of instantiating the logical group node representing the node's parent. Normally, the physical node (located in the child peer of the logical group node to be instantiated) assigned this task is the peer group leader (PGL). Thus, the node designated the PGL is required to commit network and computing resources to run the logical group node functions, maintain one or more SVCC-based RCCs, etc. in addition to providing computing resources to run the functions of a normal physical node, i.e., routing, signaling, Hello FSM protocol, etc.

A disadvantage of this is that the resource requirements required to run the logical group node functions alone may be excessive and may place a huge burden on the physical node designated the PGL. The resource requirements will vary with the number of logical nodes in the higher levels of the hierarchy, the number of physical and logical links associated therewith, etc. Note that any change in a node or link that is advertised to other nodes, requires that the complex node representation of one or more associated logical group nodes must be calculated anew. The resources required to accomplish this may dwarf the resources required just for regular node functions such as routing, signaling, etc.

SUMMARY OF THE INVENTION

The present invention is a system of building a hierarchy in a PNNI based ATM network utilizing one or more proxy SVCC-based RCC entities. The invention has application where it would be burdensome for one of the switching nodes to perform not only the normally required routing and switching functions, but also to act as peer group leader and logical group node for upper levels in the hierarchy. The invention provides for the routing, signaling, etc. functions to be separated from the functions required to be performed by the peer group leader and the logical group node. A dedicated computing platform is provided and is connected to the network but does not perform functions related to routing, signaling, etc. Rather, it is dedicated to running peer group leader and logical group node functions, including complex node representation (summarization calculations) of the child peer group.

The dedicated computer participates in the PNNI routing protocol but not the signaling protocol. It therefore advertises itself as a 'restricted transit' node and does have any direct users attached to it. The dedicated computer also has dedicated PVCs connecting it to one or more entities that are termed 'proxy SRCC' nodes. The proxy SRCC nodes perform the SRCC functionality on behalf of the dedicated computer.

When the border nodes in the peer group run the Hello FSM over outside links they each advertise the closest proxy SRCC entity, which is themselves. In response, the border nodes on the other side of the outside link are operative to generate an uplink with the advertised address of the proxy SRCC.

In this fashion, when the logical group nodes in the logical peer group establish RCC SVCCs, they will establish them to one of the proxy SRCCs. The PNNI routing messages will be relayed from the proxy SRCC to the dedicated computer peer group leader/logical group node via a previously established PVC. The dedicated computer peer group leader/logical group node is then able to flood the local logical group node PTSEs to its neighboring nodes.

An advantage of the system of the present invention is that a dedicated computer is used to perform the tasks and functionality of a logical group node, while the remainder of the nodes function as regular switches performing the non-PGL portion of the PNNI protocol, i.e., routing, signaling, etc.

There is provided in accordance with the present invention, in a Private Network to network Interface (PNNI) based Asynchronous Transfer Mode (ATM) network a method of building a PNNI hierarchy, the method comprising the steps of providing a dedicated computer for performing peer group leader and logical group node functions, including complex node representation, connecting the dedicated computer to the network, and the dedicated computer advertising itself as a restricted transit node, providing one or more proxy switched routing control channel (SRCC) nodes for performing SRCC functions on behalf of the dedicated computer, creating permanent virtual circuits (PVCs) from the dedicated computer to the proxy SRCCs, advertising, by one or more border nodes, the closest proxy SRCC thereto, generating one or more uplinks with the address of a proxy SRCC, establishing a switched virtual circuit connection (SVCC) based RCC, a logical group node, to a proxy SRCC and relaying PNNI messages from a proxy SRCC to the dedicated computer via the PVC. The proxy SRCCs are established on border nodes.

In addition, the step of providing a dedicated computer comprises the step of configuring the dedicated computer to perform the calculations of the logical group node, including the complex node representation calculations at all levels in the hierarchy, while changes in any child peer groups that cause the recalculation of the complex logical group node do not consume computing resources from any non dedicated switches that continue to create and delete switched virtual circuits (SVCs).

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DS | Database Summary |
| DTL | Designated Transit List |
| FDDI | Fiber Distributed Data Interface |
| FSM | Finite State Machine |
| IISP | Interim Inter-Switch Signaling Protocol |
| ITU | International Telecommunications Union |
| LGN | Logical Group Node |
| PGL | Peer Group Leader |
| PNM | Private Network to Network Interface |
| PTSE | PNM Topology State Element |
| PTSP | PNNI Topology State Packet |
| PVC | Permanent Virtual Circuit |
| PVP | Permanent Virtual Path |
| RCC | Routing Control Channel |
| SRCC | Switched Routing Channel Connection |
| SVC | Switched Virtual Circuit |
| SVCC | Switched Virtual Channel Connection |
| UNI | User to Network Interface |
| VCC | Virtual Channel Connection |
| VPC | Virtual Path Connection |

The present invention is a system of building a hierarchy in a PNNI based ATM network utilizing one or more proxy SVCC-based RCC entities. To better understand the principles of the present invention, a description of the PNNI hierarchy, including complex node representation and SVCC-based RCC creation, is presented herein as described in the ATM Forum Private Network to Network Interface (PNNI) Specification Version 1.0, af-pnni-0055.000, March 1996.

Logical Nodes

If the PNNI protocol supported only a flat network representation, then each lowest level node would be required to maintain the entire topology of the network, including information for every physical link in the network and reachability information for every node in the network. Although feasible for small networks, this would create enormous overhead for larger networks. Utilizing the PNNI routing hierarchy reduces this overhead while providing for efficient routing.

The PNNI hierarchy begins at the lowest level where the lowest-level nodes are organized into peer groups. A 'logical node' in the context of the lowest hierarchy level is a lowest-level node. Note that logical nodes are often denoted as 'nodes'. A peer group (PG) is a collection of logical nodes, each of which exchanges information with other members of the group, such that all members maintain an identical view of the group. Logical nodes are uniquely and unambiguously identified by 'logical node IDs'.

Figure 1:
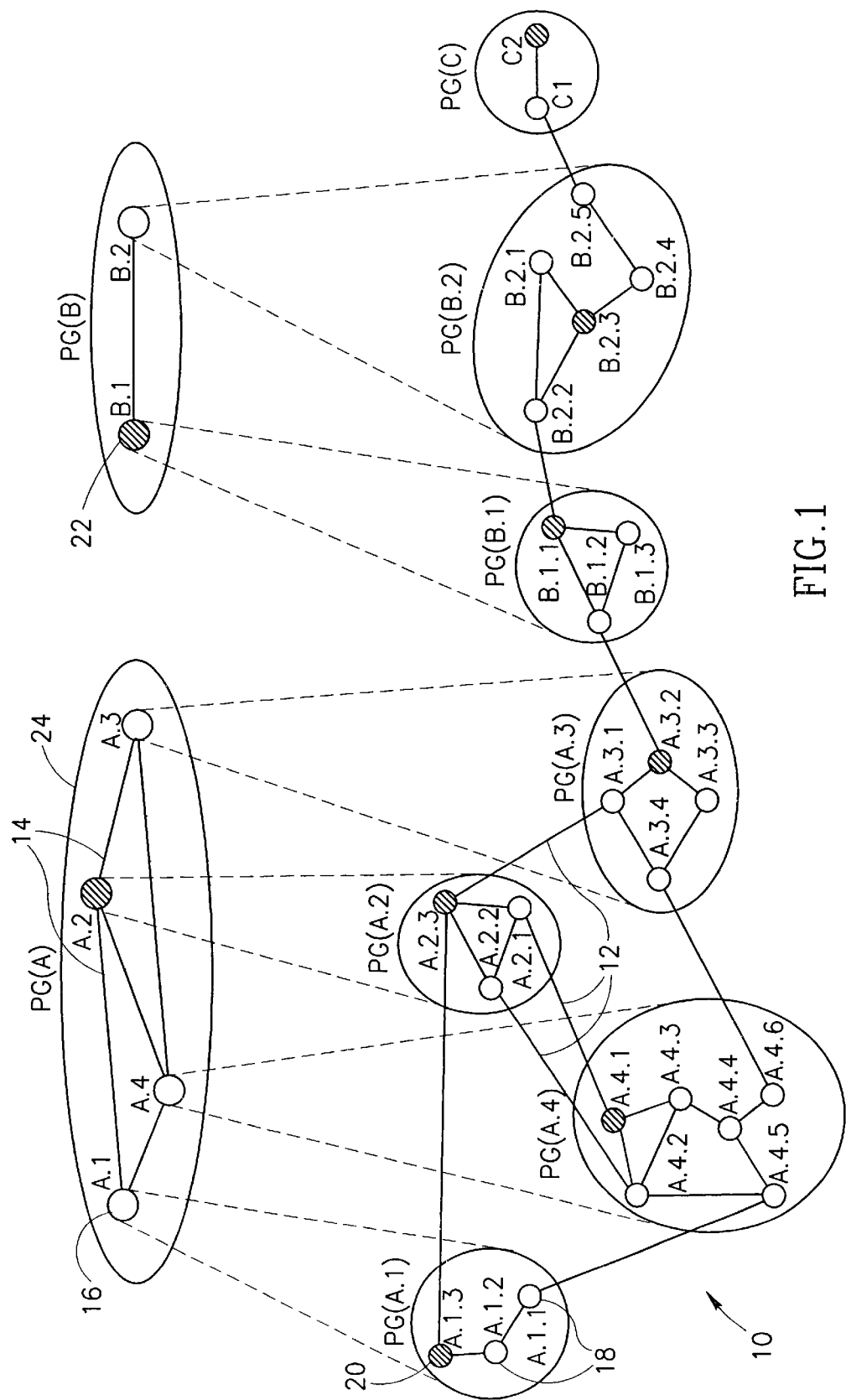
FIG. 1 is a diagram illustrating an example ATM network comprising a plurality of peer groups and two levels of hierarchy.

In the example PNNI network shown in FIG. 1, the network, generally referenced 10, is organized into 7 peer groups A.1, A.2, A.3, A.4, B.1, B.2, and C. Node and peer group numbering, such as A.3.2 and A.3, is for identification purposes only. It is an abstract representation that reflects the hierarchical structure being described. For example the node denoted by A.3.2 is located in peer group A.3.

A peer group is identified by its 'peer group identifier'. Peer group IDs are specified at configuration time. Neighboring nodes exchange peer group IDs using 'Hello packets'. If they have the same peer group ID then they belong to the same peer group. If the exchanged peer group IDs are different, then the nodes belong to different peer groups.

A 'border node' has at least one link that crosses the peer group boundary. Hence, neighboring nodes with different peer group IDs are border nodes of their respective peer groups. In the presence of certain errors or failures, peer groups can partition, leading to the formation of multiple peer groups with the same peer group ID.

The peer group ID is defined as a prefix of 14 bytes on an ATM End System Address, where the most significant byte is the level value and the remaining 13 bytes are the 13 bytes of the node's prefix. Only the most significant bits that are up to the level's length remain as they are while the remainder of the bits are set to zero. Thus, the peer group ID can default to a prefix that has the same bits up to the level in all prefixes of the nodes belonging to the same peer group.

Logical nodes are connected by one or more 'logical links'. Between lowest level nodes, a logical link is either a physical link or a VPC between two lowest-level nodes. Links between lowest level nodes in the same peer group are not aggregated. For example, if two physical links were to connect the same pair of lowest-level nodes then they would be represented by two separate logical links. Logical links inside a peer group are 'horizontal links' whereas links that connect two peer groups are 'outside links'.

When a logical link becomes operational, the attached nodes initiate an exchange of information via a well-known VCC used as a PNNI Routing Control Channel (RCC). Hello packets sent periodically by each node on this link specify the ATM End System Address, node ID, and its port ID for the fink. In this way the Hello protocol makes the two neighboring nodes known to each other. As stated previously, the PNNI Hello protocol also supports the exchange of peer group IDs so that neighboring nodes can determine whether they belong to a same peer group or to different peer groups. Note that the Hello protocol runs as long as the link is operational. It can therefore act as a link failure detector when other mechanisms fail.

Each node exchanges Hello packets with its immediate neighbors and thereby determines its local state information. This state information includes the identity and peer group membership of the node's immediate neighbors and the status of its links to the neighbors. Each node then bundles its state information in PNNI Topology State Elements (PTSEs), which are reliably flooded throughout the peer group.

PTSEs are the smallest collection of PNNI routing information that is flooded as a unit among all logical nodes within a peer group. A node's topology database consists of a collection of all PTSEs received, which represent that node's present view of the PNNI routing domain. In particular, the topology database provides all the information required to compute a route from the given node to any address reachable in or through that routing domain.

A 'logical group node' is an abstraction of a peer group for the purpose of representing that peer group in the next PNNI routing hierarchy level. For example, with reference to FIG. 1, logical group node A.2 represents peer group A.2 in the next higher level peer group A. Note that FIG. 1 shows only one example way that the lower level peer groups can be organized into the next level of peer group hierarchy.

The functions of the logical group node and the peer group leader of its child peer group are closely related. The functions of these two nodes may or may not be executed in the same system.

The functions of a logical group node include aggregating and summarizing information about its child peer group and flooding that information into its own peer group. A logical group node also passes information received from its peer group to the PGL of its child peer group for flooding. A logical group node does not participate in PNNI signaling.

A logical group node is identified by a node ID which by default contains the peer group ID of the peer group that the node is representing. A logical group node is addressable by a unique ATM End System Address that may, for example, correspond to the address of the lowest-level node in the same switching system but with a different Selector value.

The manner in which a peer group is represented depends on the policies and algorithms of the peer group leader. Thus, given two potential peer group leaders that implement the same policies and algorithms, the representation of the peer group does not depend on which of the two is elected.

Note that logical group nodes 16 in FIG. 1 are organized into peer groups 24. For example, logical nodes A.1, A.2, A.3 and A.4 are organized into peer group A. This higher level peer group is a peer group except that each of its nodes represents a separate lower level peer group. Consequently, peer group A has a peer group leader, generally referenced 22, (logical group node A.2 in particular) chosen by the leader election process. Note that the functions that define the peer group leader of A are located in node A.2, which is in turn, implemented on the switching system containing lowest-level node A.2.3.

Peer group A is called the 'parent peer group' of peer groups A. 1, A.2, A.3 and A.4. Conversely, peer groups A.1, A.2, A.3 and A.4 are called 'child peer groups' of peer group A. A parent peer group is identified by a level that must be shorter in length than its child's level. Any node capable of becoming peer group leader must be configured with its parent peer group ID.

The length of a peer group ID indicates the level of that peer group within the PNNI hierarchy. This length is referred to as the 'level indicator'. PNNI levels are not dense, in the sense that not all levels will be used in any specific topology. For example, a peer group with an ID of length 'n' bits may have a parent peer group whose ID ranges anywhere from 0 to n-1 bits in length. Similarly, a peer group with an ID of length 'm' bits may have a child peer group whose identifier ranges anywhere from m+1 to 104 bits in length. Note that 104 is the maximum peer group ID length and corresponds to 13 octets.

A logical group node represents an entire underlying peer group. The associated peer group leader 20, as a member of the underlying peer group, receives complete topology state information from all nodes 18 in the peer group. This provides the peer group leader with all of the required information to instantiate the logical group node. Conceptually this may be thought of as the peer group leader feeding information up to the logical group node it instantiates. This upward flow includes two types of information: reachability and topology aggregation.

Reachability refers to summarized address information needed to determine which addresses can be reached through the lower level peer group. Topology aggregation refers to the summarized topology information needed to route into and across this peer group. There is a filtering function inherent in the summarization process that propagates only the information needed by the higher levels. PTSEs never flow up the hierarchy. Rather, the summarized information is advertised within PTSEs originated by the logical group node and flooded to its peers.

Summarizing information up the PNNI routing hierarchy is necessary for creating the hierarchy itself and for distributing routing information about child peer groups. Conversely, feeding information down the hierarchy is necessary to allow nodes in the lower level peer groups to route to all destinations reachable via the PNNI routing domain. Route computation uses this information to select routes to destinations.

Each logical group node feeds information down to its underlying peer group. The information fed down consists of all PTSEs it originates or receives via flooding from other members of the LGN's peer group. Each PTSE that flows down to a peer group leader is flooded across that peer group. This gives every node in a peer group a view of the higher levels into which it is being aggregated. In summary, PTSEs flow horizontally through a peer group and downward into and through child peer groups.

When neighboring nodes conclude from the Hello protocol that they belong to different peer groups, they become border nodes. For example, nodes A.3.4 and A.4.6 are border nodes. Links 12 between border nodes in different peer groups are called outside links. There is no database exchange across outside links; the only PNNI protocol flows are for the Hello protocol. Border nodes extend the Hello protocol across outside links to include information (the nodal hierarchy list) about their respective higher level peer groups and the logical group nodes representing them in these peer groups. This information allows the border nodes to determine the lowest level peer group common to both border nodes. For example, the border nodes A.3.4 and A.4.6 identify that they have peer group A in common.

Figure 2:
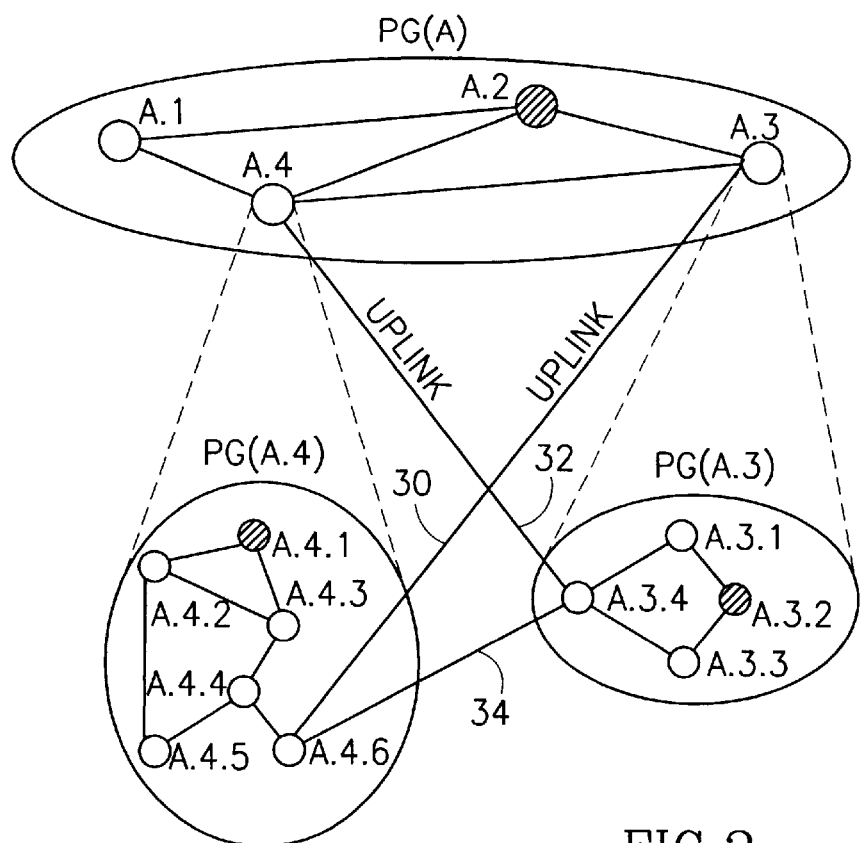
FIG. 2 is a diagram illustrating a plurality of uplinks between levels in the hierarchy.

In this fashion, each node knows the complete topology (including nodes and links) within its peer group, as well as the complete (summarized) topology of the higher level parent peer group and grand-parent peer group, etc. In order for the node to realize which border nodes have connectivity to which higher level nodes, the border nodes must advertise links to those higher level nodes. These are called uplinks as shown in FIG. 2 for the case of a two level hierarchy. Two uplinks 30, 32 are shown connecting nodes A.4.6 to A.3 and A.3.4 to A.4, respectively. The node at the other end of the uplink, the upnode, is always a neighboring peer of one of its ancestor nodes.

The nodal hierarchy list provides the border nodes with the information necessary for them to determine their common higher level peer groups and to identify the higher level nodes to which the border nodes will declare connectivity. For example, with reference to FIG. 2, border node A.3.4 recognizes that its neighbor A.4.6, connected to it by link 34, is represented by logical group node A.4 in the common parent peer group A. Consequently node A.3.4 advertises an uplink 32 between itself and upnode A.4. The uplink is denoted by (A.3.4--A.4). Similarly, node A.4.6 has an uplink 30 (A.4.6--A.3) to the remote higher level node (or upnode) A. 3.

Border nodes advertise their uplinks in PTSEs flooded in their respective peer groups. This enables all nodes in the peer group to update their topology databases with the uplinks. It also gives the peer group leaders reachability information that must be fed up the hierarchy since uplinks help create the higher level peer group.

Topology state parameters for both directions of an uplink are included in the uplink PTSE since the upnode does not advertise a PTSE for the downward direction. Topology state parameters for the reverse direction of the uplink are exchanged in Hello packets on the outside link, e.g., link 34.

Neighboring PNNI nodes have a routing control channel (RCC) for the exchange of PNNI routing information. Neighboring nodes at their lowest level of the PNNI routing hierarchy use a reserved VCC for their routing control channel. With reference to FIG. 2, the routing control channel between logical group nodes is an SVCC. The information required to establish this SVCC is derived from the uplink advertisements in the peer group represented by the logical group node.

For example, to establish the RCC between A.3 and A.4 the following steps are taken. Peer group leader A.3.2 receives the PTSE describing the uplink 32 (A.3.4--A.4) flooded by A.3.4. Peer group leader A.3.2 extracts two key pieces of information from this PTSE: (1) the ID of the common peer group that was previously identified as peer group A by the Hello protocol executing across (A.3.4--A.4.6) and (2) the ATM End System Address of upnode A.4. Node A.3.2 passes this information to its logical group node A.3. From this information, A.3 deduces that it belongs to the same peer group as A.4. It also deduces that A.4 is a neighbor and it therefore needs to have an RCC to A.4.

Since A.3 has the ATM End System Address used to reach A.4, it has sufficient information to set up the SVCC. Similarly, logical group node A.4 has enough information to set up the SVCC to A.3. Note that the protocol ensures that only one of them will initiate the SVCC establishment.

Note that at the time the SVCC for the RCC is being established, the nodes in both neighboring peer groups have all information required to route the SVCC. In particular, each peer group has its own internal topology information and knows of the existence and identity of uplinks and upnodes relevant to the routing of the SVCC-based RCC.

Logical group nodes at higher levels have behaviors similar to those of lower level nodes. For example, in FIG. 1, when the SVCC-based RCC is established between nodes A.3 and A.4, the Hello protocol is activated across it. When A.3 and A.4 confirm that they are in the same peer group they will execute an initial topology database exchange across the RCC. Note A.3 and A.4 already know they belong to the same peer group otherwise they would not have set-up the RCC; the Hello protocol simply confirms the association.

The initial topology database exchange between logical group nodes A.3 and A.4 will synchronize the databases of these two nodes. Note that information specific to the child peer groups of A.3 and A.4 is not part of these databases. Thus, the initial topology database exchange between nodes A.3 and A.4 only includes the PTSEs flooded in peer group A. Since PTSEs flow horizontally and downwards, the database exchange will also include PTSEs fed into peer group A by A.2, the peer group leader of A. Note that this assumes that the peer group leader of A exists before link (A.3--A.4) comes up. If that is not the case, no higher-level information will be available in the peer group at that time.

Horizontal links are logical links between nodes in the same peer group. Thus, with reference to FIG. 2, not only is (A.3.4--A.3.3) a horizontal link but (A.3--A.4) is also one.

This latter horizontal link is in the higher level peer group A and is created as a consequence of the uplinks 30, 32. Hellos are sent to the neighbor LGN over the SVCC-based RCC to exchange port IDs and status for horizontal links.

Horizontal links are not advertised until a successful exchange of Hellos and completion of database synchronization has occurred between neighboring nodes over the RCC. PTSEs describing the new link can now be flooded within the peer group containing the link, i.e., within peer group A, and downwards to the child peer groups.

A horizontal link between a pair of LGNs represents the connectivity between those two nodes for routing purposes. Logical group nodes are responsible for assigning port IDs to horizontal links, as well as other links attached to the node.

Nodal and Link Aggregation

Topology aggregation is the notion of reducing nodal as well as link information to achieve scaling in a large network. It is not only motivated by the need for complexity reduction but also to hide the topology internals of peer groups in the interest of security. Link aggregation refers to the representation of some set of links between the same two peer groups by a single logical link. For example, with reference to FIG. 1, the link connecting node A.2 to A.4 represents the aggregation of the two links (A.2. 1--A.4. 1) and (A.2.2--A.4.2).

Logical group nodes are responsible for link aggregation. A logical group node examines all of the uplink advertisements from its child peer group to a specific upnode. All uplinks to the same upnode with the same aggregation token, as the result of configuration, are aggregated into a single link. This link could be either a horizontal link, if the upnode is a peer of the logical group node, or an induced uplink otherwise.

Nodal aggregation is the process of representing a child peer group by a logical group node in its parent peer group. The 'complex node representation' is used to represent the result of this aggregation in the parent peer group. The complex node representation can also be used to model a lowest-level node.

Complex Node Representation

Figure 3:
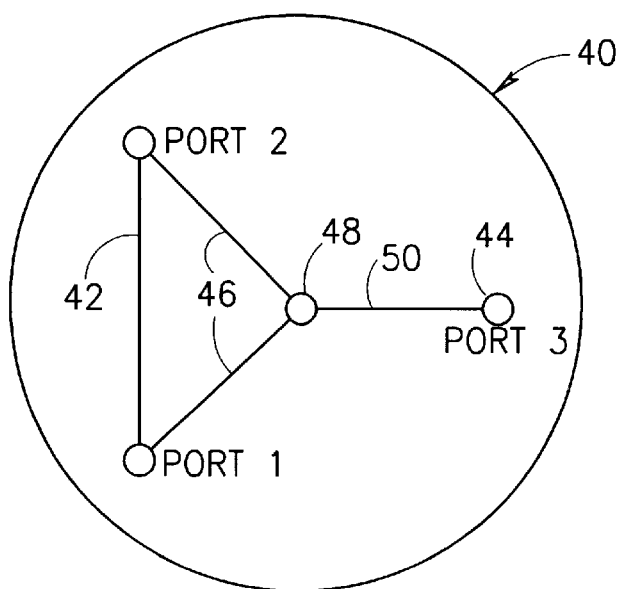
FIG. 3 is a diagram illustrating an example complex node representation of a logical node.

A diagram illustrating an example complex node representation of a logical node is shown in FIG. 3. The simplest complex node representation, generally referenced 40, is a symmetric star topology with a uniform radius. The center 48 of the star is the interior reference point of the logical node and is referred to as the nucleus. The logical connectivity between the nucleus and a port 44 of the logical node is referred to as a spoke 46. The concatenation of two spokes represents traversal of a symmetric peer group. The symmetric star topology is used as the 'default node representation,' which consists of a single value for each nodal state parameter giving a presumed value between any entry or exit of the logical node and the nucleus, in either direction.

Usually, however, peer groups are not symmetric. For example, they may contain 'outliers', i.e., nodes whose removal would significantly improve the peer group symmetry. This asymmetry can be modeled by a set of 'exceptions', one of which is shown (spoke 50). Exceptions can be used to represent particular ports whose connectivity to the nucleus is significantly different from the default. Additionally, an exception, referred to as a bypass 42, can be used to represent connectivity between two ports that is significantly better than that implied by traversing the nucleus.

The complex node representation is illustrated in the following example. Consider peer group A.4 in FIG. 1 and its summarization into the complex node represented in FIG. 3. The nucleus 48 represents the inside of the logical group node A.4. Each spoke 46 emanating from the nucleus is associated with a port of the logical group node A.4. FIG. 3 includes three spokes, one for each port. The three ports relate to FIG. 1 as follows: Port 1 represents the port on link (A.4--A. 1); Port 2 represents the port on link (A.4--A.2); and Port 3 represents the port on link (A.4--A.3).

Note that the spokes for ports 1 and 2 use the default attributes, while the spoke for port 3 is an exception. One possible cause for the exception might be if nodes A.4. 1 through A.4.5 are closely clustered whereas node A.4.6 is a distant outlier.

Node traversal can also be modeled by an exception that bypasses the nucleus. For example, the bypass 42 joining port 1 to port 2 corresponds to traversing A.4 when going between nodes A.1 and A.2. This bypass could be caused by a very high speed bypass link between nodes A.4.2 and A.4.5, for example.

Logical node A.4 distributes its complex node representation via flooding of PTSEs to nodes A.1, A.2 and A.3. The PTSEs are then passed down to the respective peer group leaders who, in turn, flood them across their own groups with the result that the topology databases of all nodes in peer groups A.1, A.2, A.3, and A.4 contain the complex node representation of A.4.

Routing across a logical group node corresponds to choosing a concatenation of spokes and/or bypasses. There is never a case where more than two spokes are included in such a concatenation or there would be a loop. The concatenation must be selected to meet the resource requirements of the call. For example, with reference to FIGS. 1 and 3, assume logical link (A.1--A.2) is congested so that node A.3.4 routes to a node inside peer group A.1 either via logical links (A.3--A.4), (A.4--A.1) or (A.3--A.2), (A.2--A.4), (A.4--A.1Furthermore, assume that the two paths are equivalent from the routing criteria point of view (plausible since both traverse similar number of links). Then path selection corresponds to choosing the best of the following three possible complex node traversals: (1) concatenation of the two spokes with default attributes; (2) concatenation of the exception spoke 50 and a spoke with default attributes; and (3) bypass 42.

If the best option is to use the bypass 42 then route (A.3--A.2), (A.2--A.4), (A.4--A.1) is the preferred route. Node A.3.4 will therefore use the link (A.4.2--A.4.5) when routing to a node inside peer group A.1. Note that routing to an internal reachable address in a logical group node corresponds to choosing a spoke or a concatenation of bypasses and a spoke to the nucleus with acceptable attributes.

A complex node representation is a collection of nodal state parameters that provide detailed state information associated with a logical node. It is used to express the case where traversing into or across a node has a significant effect on the end-to-end parameter values of connections.

To accommodate traversing a logical node as well as routing to the 'inside' of the node, a symmetric star topology with a uniform 'radius' is used. The center of the star is the interior reference point of the logical node, and is referred to as the nucleus. The logical connectivity between the nucleus and a port of the logical node is referred to as a spoke. PNNI Routing supports a default node representation, which consists of a single value for each nodal state parameter, giving a presumed value between any entry or exit of the logical node and the nucleus, in either direction.

For each nodal state parameter associated with a logical node, a 'radius' is derived from the 'diameter' of the logical node. For a nodal metric, the 'radius' is simply half the 'diameter'. For a nodal attribute, the 'radius' is the same as the 'diameter'. PNNI Routing, however, does not specify how the aggregation is taken to determine the 'diameter'. A conservative advertiser may take worst case values. Aggressive advertisers may consider the average case, or even the best case.

Note that in this context and throughout this document, the term 'half' refers to finding a metric value that when algorithmically combined with itself will produce the value that is to be halved. It is important to note that halving this value does not necessarily imply a traditional arithmetic division by two.

The default node representation offers the greatest reduction of advertised information (short of using the simple node representation). It cannot, however, fully capture the multiple connectivity in a typical logical node or reflect asymmetric topology information.

Given that a logical node is in general not perfectly round, PNNI Routing permits the topology state parameters associated with any given spoke to be different from the default 'radius'. In addition, direct port to port connectivities, known as 'bypasses', may also be advertised.

Using this, one may advertise practically any aggregated topology ranging from a symmetric star to a full mesh. A connectivity advertisement that represents something other than the default node representation is called an exception.

The complex node representation for PNNI Routing can be constructed as described below:

1. Conceptually overlay on each logical node a star topology with a nucleus representing the 'inside' of the corresponding node, and spokes connecting the ports of the logical node to the nucleus. Each port ID must be the same as the port ID used to identify the link or reachable addresses associated with the port.
2. For each nodal state parameter, advertise a 'radius' to be used as the default value for the spokes.
3. Any spoke or any logical connectivity between a pair of ports may be designated as an 'exception'.
4. For each such exception, advertise the entire set of nodal state parameters associated with it. For bypasses, nodal state parameters must be specified in both directions.
5. For each spoke advertised as an exception, the exception nodal state parameters supersede the default information in the directions in which the exceptions are specified.
6. A path through the logical node is obtained from a concatenation of any number of bypasses and at most two spokes (default or exception) in the complex node representation.

With the above complex node representation, one may choose to advertise conservatively or aggressively depending on parameter values assigned to the 'radius' and 'exceptions'. PNNI Routing does not specify how spokes and bypasses are selected to be advertised as exceptions.

The hierarchical summarization described above allows nodes in the highest level of the hierarchy to calculate routes to any destination represented in the highest level peer group (including systems reachable via lower levels, which are announced via summary address prefixes). It is necessary, however, for all nodes in the PNNI network to be able to route calls to any destination, not just nodes actually at the highest level of the hierarchy. This implies that the topological information describing the higher levels of the hierarchy must be available to the lower level nodes.

This requires that all nodes participating in PNNI routing maintain information in their topology databases (and the capability of calculating routes) not only for their own peer group, but also for all of their ancestor peer groups. The higher level PTSEs are flooded to all nodes of their peer group, and in addition are flooded to all nodes of all descendant peer groups, allowing all nodes to directly calculate appropriate routes (even those nodes which are not explicitly represented in the summarized higher level topology).

Flooding of PTSEs to all nodes of all descendant peer groups (i.e., to all lower-level nodes contained in the lower-level peer groups represented by the nodes in this peer group, and so on), is achieved as follows:

1. When originating a new PTSE or updating a PTSE that it had previously originated, a higher-level node floods the PTSE to the PGL of the peer group that the higher-level node represents, as well as the usual process of flooding to all neighboring peers at its level. The PGL will, in turn, flood the PTSE in the child peer group.
2. When flooding a received PTSE that is new or more recent than its topology database copy, a higher-level node floods the PTSE to the PGL of the peer group that the higher-level node represents, as well as the usual process of flooding to all neighboring peers at its level other than the one from which the PTSE was originally received. The PGL will, in turn, flood the PTSE in the child peer group.

PTSEs generated in a given peer group never get flooded to the next higher level peer group. Instead, the peer group leader summarizes the topology of the peer group based on the PTSEs generated within the peer group, but the summary is flooded in new PTSEs originated by the LGN at the parent peer group's level.

The PNNI complex node representation is a flexible scheme for describing the connectivity within a logical node. When a logical group node produces a complex node representation, it makes a tradeoff between the accuracy of that representation and its size. Alternatively, it may use the simple node representation, in which the entire LGN is treated as a point, with no resource constraints. It is important to point out that the PNNI specification does not disclose the algorithms used to derive the aggregated topology description and states that they are implementation specific.

Figure 4:
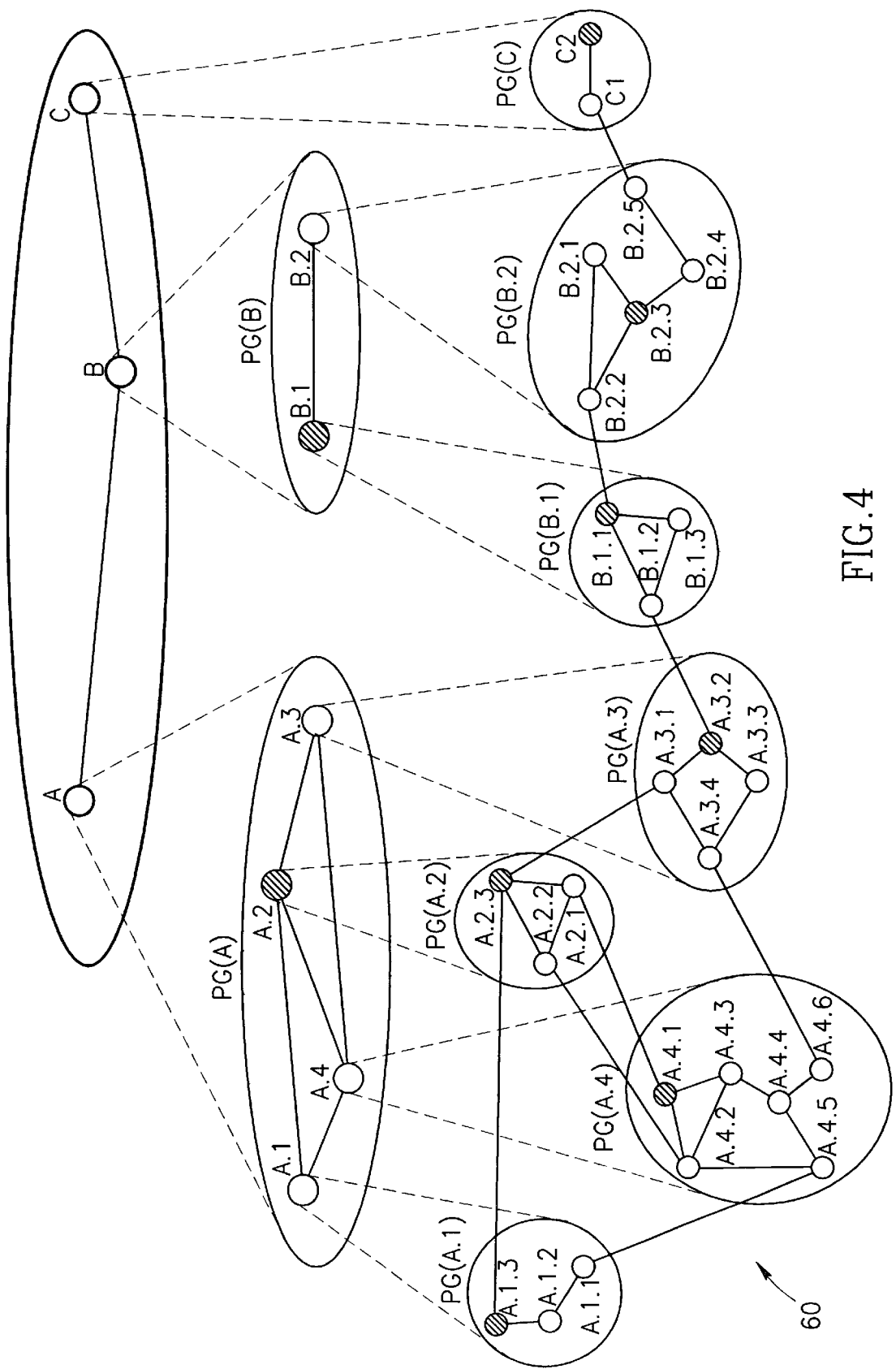
FIG. 4 is a diagram illustrating a complete PNNI hierarchical configured network.

The PNNI routing hierarchy example shown in FIG. 1 can be continued, as the higher level peer groups (FIG. 1) do not exhibit connectivity among each other. One possible completion of the hierarchy is illustrated in FIG. 4. Completion of the hierarchy is achieved by creating ever higher levels of peer groups until the entire network is encompassed in a single highest level peer group. In the example network, generally reference 60, shown in FIG. 4, this is achieved by configuring one more peer group containing logical group nodes A, B and C. Node A represents peer group A which in turn represents peer groups A.1, A.2, A.3, A.4 and so on. Another possible configuration would be if peer groups B and C were aggregated into a peer group BC which was then aggregated with peer group A to form the highest level peer group. In general, the network designer controls the hierarchy via configuration parameters that define the logical nodes and peer groups.

The hierarchical structure disclosed herein is very flexible. The upper limit on successive, child/parent related, peer groups is given by the maximum number of ever shorter address prefixes that can be derived from a longest 13 byte address prefix. This equates to 104, more than enough since even international networks can be more than adequately configured with less than 10 levels of ancestry.

The PNNI routing hierarchy allows asymmetries in the sense that for a given lower level peer group its parent peer group can simultaneously be a grandparent or great-grandparent peer group to some other lower level peer group. For example, with reference to FIG. 4, the lower level peer group C is directly represented in the highest level peer group by logical group node C whereas lower level peer groups B.1 and B.2 are first grouped into the parent peer group B before being represented at the highest level by logical group node B.

Figure 5:
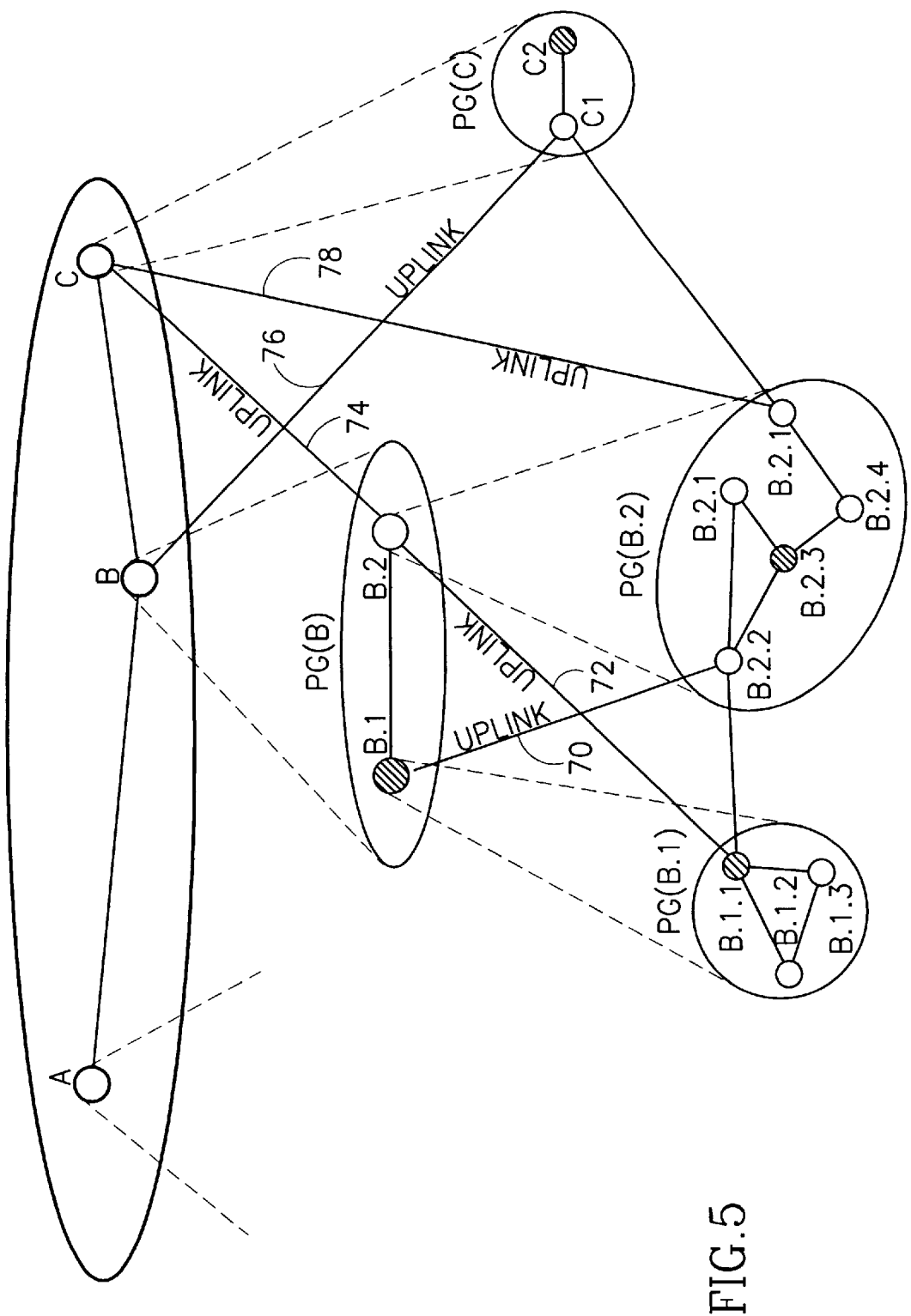
FIG. 5 is a diagram illustrating a plurality of uplinks between various levels in the hierarchy.

The uplinks in this scenario are illustrated in FIG. 5. Four uplinks are created: 78 (B.2.5--C), 76 (C.1--B), 72 (B.1.1--B.2) and 70 (B.2.2--B.1). Uplink 74 (B.2--C), however is different in that it is derived from uplink 78 (B.2.5--C). This is called an 'induced uplink.' When the peer group leader B.2.3 receives the PTSE (flooded by B.2.5) describing the uplink 78 (B.2.5--C) it passes the common peer group ID (the highest level peer group in this case) and the ATM End System Address of the upnode C to its LGN B.2. From this information, B.2 recognizes that node C is not a member of peer group B. It therefore derives a new uplink (B.2--C) that expresses the reachability to C from the perspective of B.2. Since B.2 represents B.2.5, uplink 74 (B.2--C) is a higher level representation of uplink 78 (B.2.5--C).

If another link were to connect B.2.1 to C.1, then uplink 74 (B.2--C) could represent the aggregation of two lower level uplinks, namely uplink 78 (B.2.5--C) and an uplink from B.2.1 to C. This would be determined by the aggregation tokens in the two uplinks.

Induced uplinks may also be derived from induced uplinks at the next lower level. In the example shown in FIG. 5, if there were additional peer groups between peer group B and the highest level peer group, there would be additional uplinks derived to upnode C.

Establishment of SVCC based RCCs

An SVCC-based RCC is established between LGNs B and C as follows. After creating the uplink 74 (B.2--C), B.2 floods its peer group B with a PTSE specifying the new uplink. On receiving the uplink information, peer group leader B.1 passes the common peer group ID (the highest level peer group in this case) and the ATM End System Address of the upnode C to its LGN B. Node B recognizes from this that node C is located in its peer group and now has sufficient information to set up the SVCC-based RCC between LGNs B and C.

Node B chooses a path to node C through one of the border nodes advertising an uplink to C. In this example, since B.2 is the only border node advertising an uplink to upnode C, the SVCC will transit border node B.2.

The SVCC-based RCCs between neighboring LGNs are established based on information gathered by PNNI. The SVCC will traverse a border node which is declaring an uplink to the appropriate logical group node. Where there are many border nodes advertising uplinks to the same logical group node, any of the border nodes may be selected.

Each LGN finds out about the address of neighboring LGNs from the uplinks announced by border nodes in the peer groups that the LGN represents. Specifically, the called party address used must be the ATM End System Address for the neighboring LGN at the other end of the uplink which the SVCC is intended to cross, as advertised by the border node. It is important to point out that in accordance with the PNNI specification, there is no requirement that different border nodes report the same ATM End System Address for the neighboring LGN. This means that the same logical group node may advertise different destination addresses, each destination address associated with a different outside link from its child peer group.

The system of the present invention takes advantage of the lack of a requirement in the PNNI specification that different border nodes report the same ATM End System Address for the neighboring LGN to solve the problem of the prior art whereby a PGL requires relatively huge computing resources to run the logical group node complex node representation, summarization and generation of PTSEs.

In accordance with the present invention, a dedicated computing platform, e.g., PC or equivalent, is provided to run the algorithms associated with the logical group node and being the peer group leader. In this fashion, the nodes at the lowest level, which are switches performing the actual switching functionality, are not disturbed and burdened with running logical group node algorithms. In addition, since the dedicated computing platform is dedicated only to running the logical group node algorithms and peer group leader functions, it is not necessary for it to run the real time signaling functionality also.

Dedicated Peer Group Leader/Logical Group Node

Figure 6:
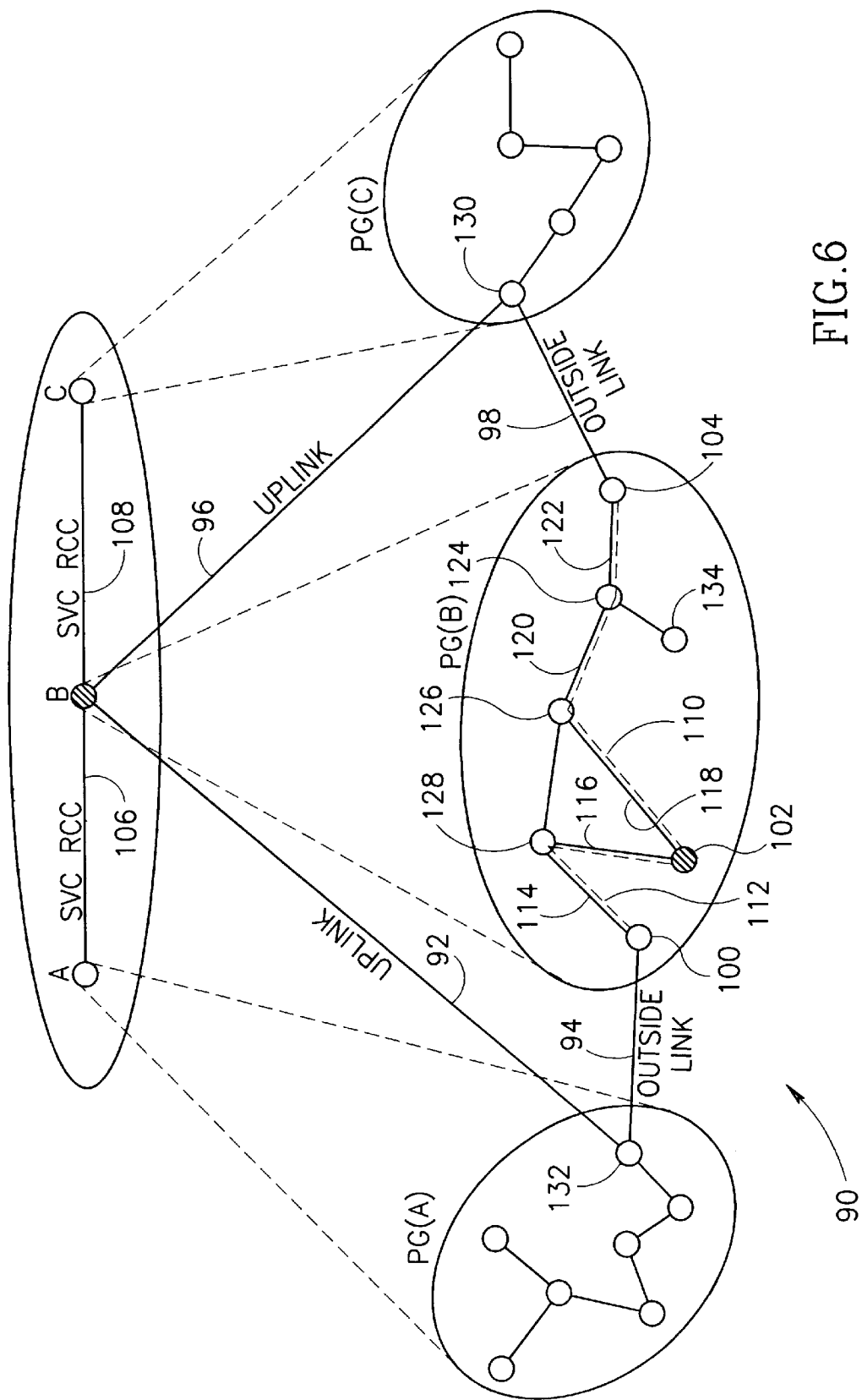
FIG. 6 is a diagram illustrating an example PNNI hierarchy, including a dedicated peer group leader node and proxy SRCC nodes, constructed in accordance with the present invention.
Figure 7:
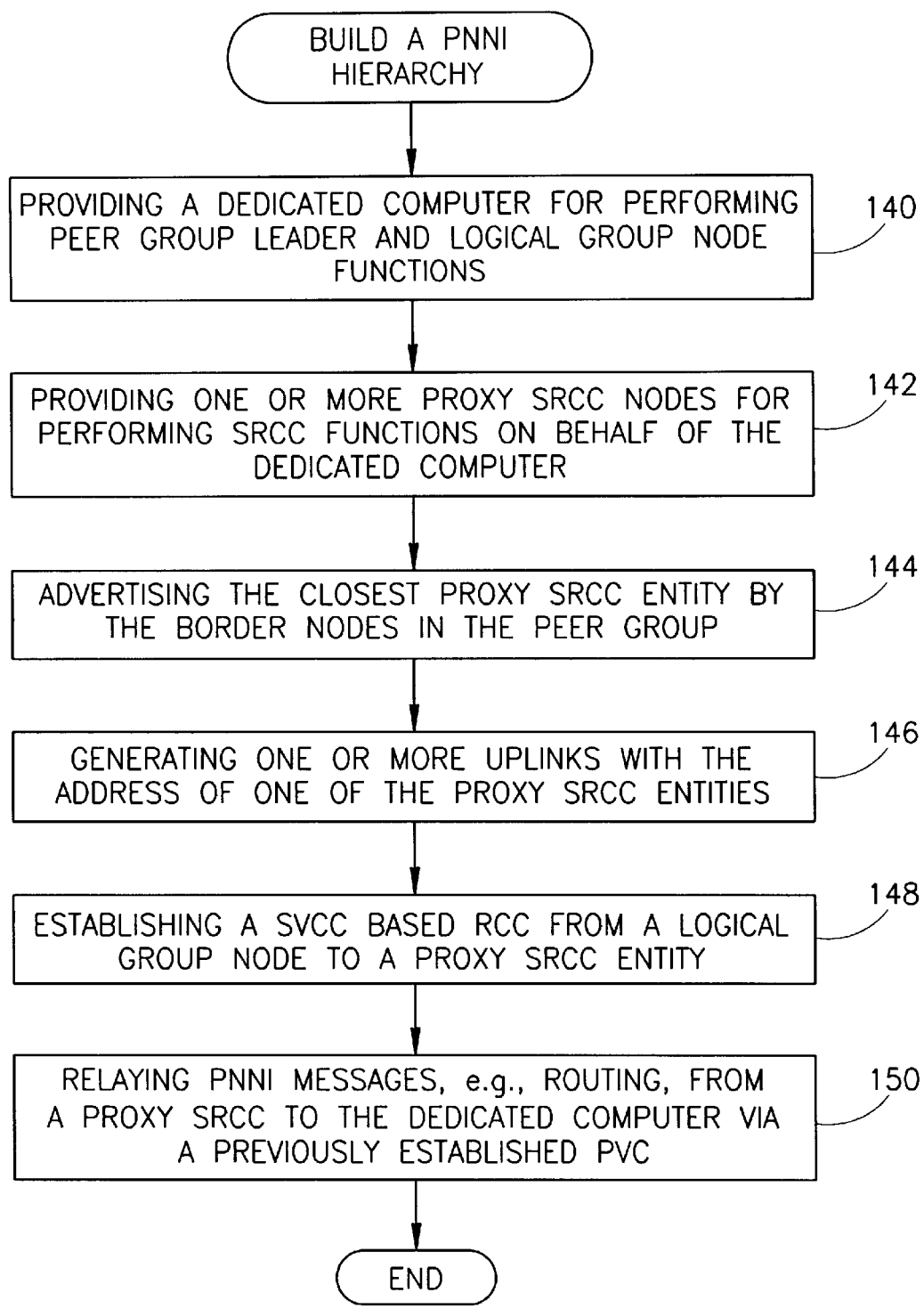
FIG. 7 is a flow diagram illustrating the PNNI hierarchy building method of the present invention.

A diagram illustrating an example PNNI hierarchy, including a dedicated peer group leader node and proxy SRCC nodes, constructed in accordance with the present invention is shown in FIG. 6. A flow diagram illustrating the PNNI hierarchy building method of the present invention is shown in FIG. 7. The following description refers to both FIG. 6 and FIG. 7.

The example network, generally referenced 90, comprises a two level hierarchy including three peer groups in level 1 and one in level 2. The second level peer group comprises three logical group nodes A, B and C corresponding to peer groups A, B and C, respectively. Note that the network 90 shown is presented to illustrate the principles of the present invention and should not be considered as limiting the scope of the invention. Application of the principles of the present invention can be made to a multitude of other network configurations as well without departing from the scope of the invention.

Peer group B comprises six nodes 100, 128, 126, 124, 104, 134 that perform normal PNNI functions, i.e., routing, signaling, etc. In accordance with the present invention a seventh physical node 102 (indicated by the cross hatched circle) is provided as a dedicated computing platform that does not perform functions related to routing, signaling, etc. Rather, it is dedicated to running peer group leader and logical group node functions, including complex node representation (summarization calculations) of the child peer group B (step 140).

Peer group B is connected to border node 132 in peer group A via outside link 94 and to border node 130 in peer group C via outside link 98. Logical group node B is connected to LGN A via logical link 106 and to LGN C via logical link 108. Logical group node B is connected to border node 132 in peer group A via uplink 92 and to border node 130 in peer group C via uplink 96.

In accordance with the present invention, the middle logical group node B is instantiated by the dedicated computer 102 in the child peer level. Note that the dedicated computer participates in the PNNI routing protocol but not the signaling protocol. It therefore advertises itself as a 'restricted transit' node and does have any direct users attached to it. Having no users attached assures that no signaling messages will be sent to it. A restricted transit node may not be used for transit purposes. Such a node is not used to perform routing or signaling and is not used for transiting a call.

The dedicated computer 102 also has dedicated PVCs connecting it to one or more entities that are termed 'proxy SRCC' entities or nodes (step 142). The proxy SRCC nodes perform the SRCC functionality on behalf of the dedicated computer. In the example shown in FIG. 6, the proxy SRCC nodes are the two border nodes 100 and 104. Thus, the dedicated computer 102 is connected via PVC 112 (as indicated by the dashed line) to the proxy SRCC 100 via the path comprising link 116, node 128, link 112. Similarly, the dedicated computer 102 is connected via PVC 110 (as indicated by the dashed line) to the proxy SRCC 104 over the path comprising link 118, node 126, link 120, node 124, link 122.

When the border nodes 100, 104 run the Hello finite state machine (FSM) over outside links 94, 98, respectively, they each advertise the closest proxy SRCC entity (step 144). In the case of both border nodes, in the example network 90 shown in FIG. 6, the closest proxy SRCC entity is the border node itself, i.e., border node 100,is the closest proxy SRCC for border node 100 and border node 104 is the closest proxy SRCC for border node 104.

In response, the border nodes on the other side of the outside link are operative to generate an uplink with the advertised address of the proxy SRCC (step 146). With reference to the example in FIG. 6, border node 132 upon receiving an advertisement from the Hello FSM from border node 100, generates uplink 92 using the address of the proxy SRCC 100. Similarly, border node 130 upon receiving an advertisement from the Hello FSM from border node 104, generates uplink 96 using the address of the proxy SRCC 104.

In this fashion, when the logical group nodes in the logical peer group establish RCC SVCCs, they will establish them to one of the proxy SRCCs in peer group B (step 148). The PNNI routing messages will be relayed from the proxy-SRCC-to-the dedicated computer peer group leader/logical group node 102 via a previously established PVC (step 150). Thus, the dedicated computer peer group leader/logical group node 102 is able to flood the local logical group node PTSEs to its neighboring nodes. Note that the switching of data in both directions from the SVCCs to the PVC 110, 112, is performed in an automatic fashion.

As advantage of the system of the present invention is that a dedicated computer is used to perform the tasks and functionality of a logical group node, while the remainder of the nodes function as regular switches performing the non-PGL portion of the PNNI protocol, i.e., routing, signaling, etc.

The dedicated computer is configured such that it performs the calculations of the logical group node, including the complex node representation calculations at all levels in the hierarchy. In addition, the computer is configured such that changes in any of the child peer groups that cause the recalculation of the complex logical group node do not consume CPU resources from the non dedicated switches that continue to create and delete SVCs.

Note that the dedicated computer cam be connected to the ATM network via an ATM adapter card installed in a commercially available personal computer having suitable computing resources to perform as a peer group leader/logical group node. The ATM adapted card is connected to one of the switches in the network. Further, to increase reliability of the network, two or more dedicated computers can be deployed, whereby one is on-line and the others operate as hot spares ready to take over in the event the main dedicated computer fails. To improve the effectiveness, the backup dedicated computers are preferably placed in different parts of the network.

While the invention has been described with respect to a limited number of embodiments, it will be appreciated that many variations, modifications and other applications of the invention may be made.

What is claimed is:

1. A method of building a Private Network to Network Interface (PNNI) hierarchy in an Asynchronous Transfer Mode (ATM) network, said method comprising the steps of:

providing a dedicated computer for performing peer group leader and logical group node functions, including complex node representation, connecting said dedicated computer to said network, and said dedicated computer advertising itself as a restricted transit node;

providing one or more proxy switched routing control channel (SRCC) nodes for performing SRCC functions on behalf of said dedicated computer;

creating permanent virtual circuits (PVCs) from said dedicated computer to said proxy SRCC nodes;

advertising, by one or more border nodes, the closest proxy SRCC node thereto;

generating one or more uplinks with the address of a proxy SRCC;

establishing a switched virtual circuit connection (SVCC) based Routing Control Channel (RCC) from a logical group node to a proxy SRCC node; and relaying PNNI messages from a proxy SRCC node to said dedicated computer via said PVC.

2. The method according to claim 1, wherein said proxy SRCCs are established on border nodes.

3. The method according to claim 1, wherein said step of providing a dedicated computer comprises the step of configuring said dedicated computer to perform the calculations of the logical group node, including the complex node representation calculations at all levels in the hierarchy, while changes in any child peer groups that cause the recalculation of the complex logical group node do not consume computing resources from any non dedicated switches that continue to create and delete switched virtual circuits (SVCs).

4. An apparatus for building a Private Network to Network Interface (PNNI) hierarchy in a PNNI based Asynchronous Transfer Mode (ATM) network, comprising:

a computing device for performing peer group leader and logical group node functions, including complex node representation;

one or more proxy switched routing control channel (SRCC) nodes in communication with said computing device for performing SRCC functions on behalf of said computing device;

means for advertising the closest proxy SRCC node;

means for generating one or more uplinks with the address of a proxy SRCC;

means for establishing a switched virtual circuit connection (SVCC) based Routing Control Channel (RCC) from a logical group node to a proxy SRCC node; and means for relaying PNNI messages from a proxy SRCC node to said computing device.

5. The apparatus according to claim 4, wherein said one or more proxy SRCC nodes communicate with said computing device via permanent virtual connections.

6. The apparatus according to claim 4, wherein said advertising means is adapted to advertise said closest proxy SRCC node via one or more border nodes.

* * * * *